(12) United States Patent
Laskow (10) Patent No.: US 8,180,493 B1
(45) Date of Patent: May 15, 2012

(54) METHOD AND APPARATUS FOR EFFECTING TEMPERATURE DIFFERENCE IN A RESPECTIVE ZONE

(76) Inventor: Paul Ira Laskow, Westborough, MA (US)

(*) Notice: Subject to any disclaimer, the term of this patent is extended or adjusted under 35 U.S.C. 154(b) by 354 days.

(21) Appl. No.: 12/554,103

(22) Filed: Sep. 4, 2009

(51) Int. Cl.
| | |
|---|---|
| G01M 1/38 | (2006.01) |
| G05B 13/00 | (2006.01) |
| G05B 15/00 | (2006.01) |
| G05D 23/00 | (2006.01) |
| A47J 39/00 | (2006.01) |
| F25B 29/00 | (2006.01) |
| F24F 3/00 | (2006.01) |
| B60H 1/00 | (2006.01) |

(52) U.S. Cl. ........ 700/277; 700/275; 700/276; 700/278; 165/201; 165/203; 165/205; 165/208; 165/212; 236/1 B (58) Field of Classification Search .......... 700/275–278; 165/201, 203, 205, 208–209, 212; 236/1, 236/1 R
See application file for complete search history.

(56) References Cited

U.S. PATENT DOCUMENTS

| | | | | |
|---|---|---|---|---|
| 4,187,543 | A | * | 2/1980 | Healey et al. ................. 700/277 |
| 5,172,856 | A | * | 12/1992 | Tanaka et al. ................. 236/49.3 |
| 5,187,943 | A | * | 2/1993 | Taniguchi et al. ............. 62/180 |
| 5,291,748 | A | * | 3/1994 | Ueda .............................. 62/179 |
| 5,481,481 | A | * | 1/1996 | Frey et al. ....................... 702/82 |
| 5,596,507 | A | * | 1/1997 | Jones et al. ................... 700/276 |
| 5,627,328 | A | * | 5/1997 | Sheridan et al. ........... 73/863.83 |
| 6,711,470 | B1 | * | 3/2004 | Hartenstein et al. .......... 700/276 |
| 2004/0173599 | A1 | * | 9/2004 | Velichko et al. .............. 219/494 |
| 2007/0233323 | A1 | * | 10/2007 | Wiemeyer et al. ............ 700/276 |
| 2009/0052859 | A1 | * | 2/2009 | Greenberger et al. ......... 386/46 |
| 2009/0065596 | A1 | * | 3/2009 | Seem et al. ..................... 236/51 |
| 2010/0163633 | A1 | * | 7/2010 | Barrett et al. ................ 236/49.3 |

* cited by examiner

*Primary Examiner* — Ramesh Patel
(74) *Attorney, Agent, or Firm* — Chapin IP Law, LLC (57) ABSTRACT

Methods and apparatus provide for a demand limiting controller. The demand limiting controller obtains at least one temperature condition and at least one temperature modification rate associated with at least one respective zone from multiple zones of a confined area. The demand limiting controller determines when to modify a current temperature of the respective zone with respect to an upcoming event by processing the temperature condition according to the temperature modification rate while minimizing the opportunity for all zones to be energized simultaneously.

23 Claims, 9 Drawing Sheets

METHOD AND APPARATUS FOR EFFECTING TEMPERATURE DIFFERENCE IN A RESPECTIVE ZONE

BACKGROUND

Air conditioning and refrigeration are provided through the removal of heat. Heat can be removed through the process of radiation, convection, and conduction using mediums such as water, air, ice, and chemicals referred to as refrigerants. An air conditioning system provides cooling, ventilation, and humidity control for all or part of a house, building or refrigerator/freezer. The refrigerant provides cooling through a process called the refrigeration cycle. The refrigeration cycle consists of four essential elements to create a cooling effect. A compressor provides compression for the system. This compression causes the cooling vapor to heat up. The compressed vapor is then cooled by heat exchange with the outside air, so that the vapor condenses to a fluid, in the condenser. The fluid is then pumped to the cooling zone, where it enters an evaporator. In this evaporator, small spray nozzles spray the cooling fluid into a chamber, where the pressure drops and the fluid evaporates. Since the evaporation absorbs heat from the surroundings, the surroundings cool off, and thus the evaporator absorbs or adds heat to the system. The vapor is then returned to the compressor. A metering device acts as a restriction in the system at the evaporator to ensure that the heat being absorbed by the system is absorbed at the proper rate.

BRIEF DESCRIPTION

Conventional systems that regulate and control one or more Heating, Ventilating and Air Conditioning (HVAC) units in a building or multiple refrigeration/freezer units in warehouse or retail environments suffer from a variety of deficiencies. Such conventional systems do not limit the amount of electricity used during a time period when the electricity billing rate is the highest or take into account a total amount of electricity being consumed at any particular point in time. Also, such conventional systems are limited to continually monitor the temperatures of various internal spaces within a building but do not predict when a particular internal space's temperature will be outside of an acceptable temperature range with regard to the current outdoor temperature.

Techniques discussed herein significantly overcome the deficiencies of conventional applications such as those discussed above. As will be discussed further, certain specific embodiments herein are directed to a demand limiting controller.

The demand limiting controller continually monitors the current temperatures occurring within various zones of a confined area (such as a warehouse, office area, room, or refrigeration/freezer units) and an outdoor temperature. The demand limiting controller also keeps track of various upcoming events within each zone to determine if a zone's current temperature requires modification in anticipation of the upcoming event's occurrence.

Specifically, in various embodiments, the demand limiting controller obtains at least one temperature condition and at least one temperature modification rate (such as a cooling rate or heating rate) associated with at least one respective zone from multiple zones of a confined area. The demand limiting controller determines when to modify the respective zone's current temperature with respect to an upcoming event by processing the temperature condition(s) according to the temperature modification rate. It is understood that a zone can be a defined portion of space within a building that is heated and cooled by a particular temperature modification unit(s), which can be, for example, an HVAC unit or any kind of refrigeration/freezer unit(s) with a refrigeration system.

It is also understood that the demand limiting controller can concurrently perform the teaching discussed in this entire document with respect to multiple zones within one or multiple confined areas.

For example, in one embodiment, the demand limiting controller detects an upcoming event is about to begin within a calculated time defined by the collection of data by the demand limiting controller, such as the beginning of a time period associated with the highest electricity billing rate (i.e. a peak rate time range).

In order to determine how much time is needed to cool the respective zone to a target low temperature before the peak rate time range begins, the demand limiting controller processes the respective zone's current temperature, the current outdoor temperature and the current time according to the respective zone's cooling rate.

For example, based on the cooling rate, the demand limiting controller determines the temperature modification unit(s) located in the respective zone can cool the respective zone within twenty-three minutes. Twenty-three minutes before the peak rate time range begins, the demand limiting controller activates the temperature modification unit to cool the respective zone to a pre-peak rate temperature. When the peak rate time range begins, or the zone reaches the desired temperature the demand limiting controller turns the temperature modification unit off, and sets the zone temperature to a higher peak rate temperature.

Hence, the demand limiting controller has "pre-cooled" the respective zone in anticipation of the peak rate time range. Since the demand limiting controller (i) cools the respective zone before the peak rate time range begins and (ii) sets the zone temperature above its pre-cool temperature once the peak rate time range begins, the demand limiting controller minimizes the use of electricity during the peak rate time range and lowers costs associated with power consumption.

In addition, the demand limiting controller continually updates the data describing amounts of time that occur between temperature changes as the temperature modification unit cools the respective zone. Hence, over time, the respective zone's cooling rate becomes more accurate in describing how much time is actually required to change the respective zone's current temperature depending on the outdoor temperature.

In another embodiment, the demand limiting controller continually monitors the current temperature of each zone and the current outdoor temperature. For each zone, the demand limiting controller continually captures the respective zone's current temperature and outdoor temperature to determine the respective zone's cooling rate (or heating rate) to predict when the temperature within the respective zone will move outside of a desired temperature range (i.e. a target range).

When the demand limiting controller predicts that a respective zone's current temperature will move outside of a target range within a predetermined amount of time (such as within 15 minutes, for example), and the desired maximum amount of electricity is not already being used, the demand limiting controller activates the temperature modification unit located in the respective zone to cool (or heat) the respective zone towards a target temperature.

The demand limiting controller cools (or heats) the respective zone until it determines that another temperature modification unit associated with a different zone requires electricity either for "pre-cooling," heating or to avoid the current temperature in that other zone from moving outside its respective target range. If another temperature modification unit needs to change the temperature in its corresponding zone, and the desired maximum amount of power is currently not being totally consumed, the demand limiting controller can allow for multiple temperature modification units to be running so long as the desired maximum amount of power is not exceeded.

In yet another embodiment, some of the temperature modification units located amongst the multiple zones have a damper that provides natural, outside air to be ventilated throughout a respective zone. Thus, instead of consuming electricity by using a temperature modification unit to cool a respective zone, the demand limiting controller can cool the respective zone by allowing outside air in the respective zone.

The demand limiting controller obtains the outdoor temperature and monitors the rate at which the respective zone's current temperature falls. Based on this rate of decline with respect to the outdoor temperature, the demand limiting controller determines the extent to which the temperature modification unit's damper is open (i.e. 20% open, 30% open). The demand limiting controller opens the damper and activates a fan to introduce outside air in the respective zone and to move the respective zone's current temperature towards a target temperature.

As the respective zone's current temperature changes due to the newly-introduced outside air, the demand limiting controller can continually adjust the extent the damper is open. Thus, the demand limiting controller gradually closes the damper as the respective zone's current temperature approaches the target temperature. If the outside temperature in combination with the maximum volume of outside air is insufficient to cool the zone to the desired temperature, the demand limiting controller will energize the cooling portion of the temperature modification unit.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a demand limiting controller, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
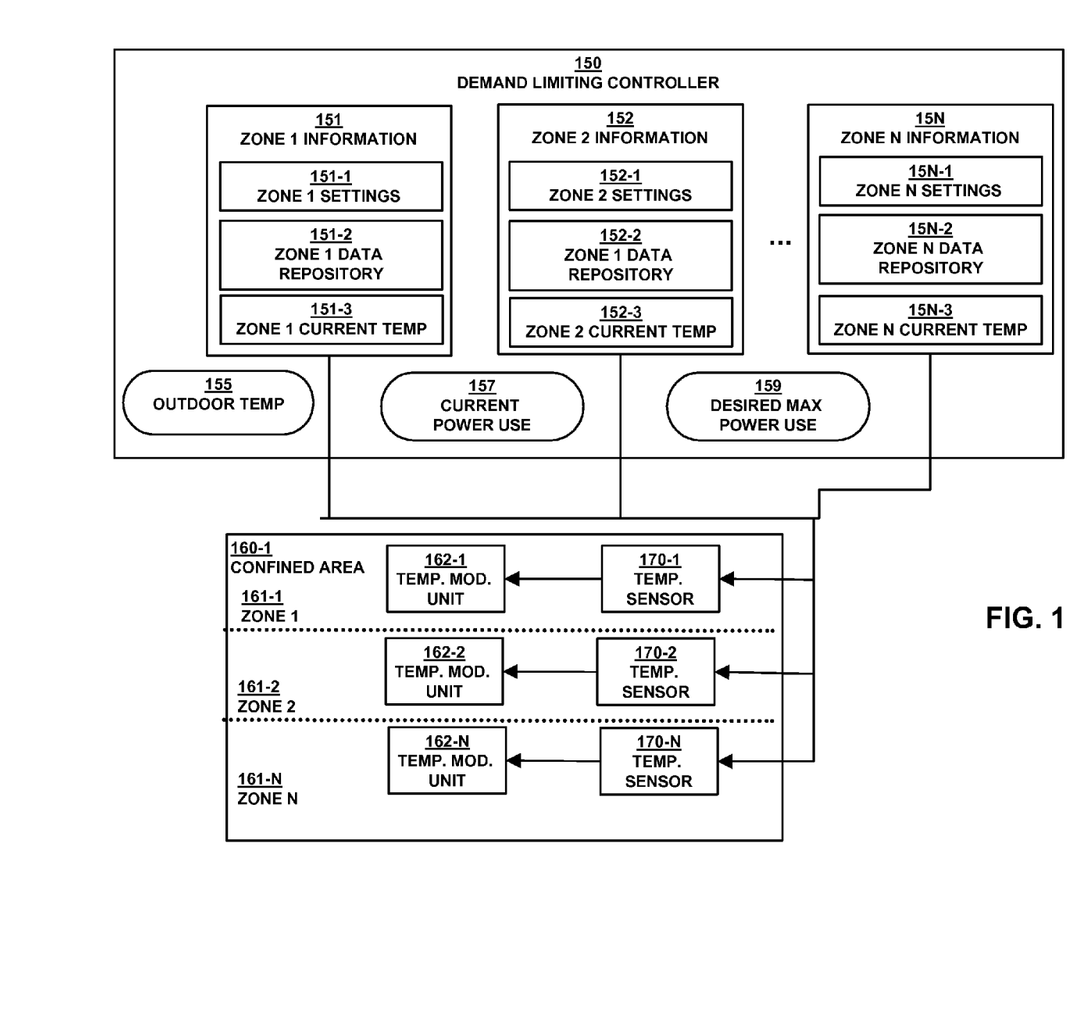
FIG. 1 is an example block diagram of a demand limiting controller according to embodiments herein.

FIG. 1 is an example block diagram of a demand limiting controller 150 according to embodiments herein.

A confined area 160-1, such as a commercial, industrial, retail, office, residential or hotel building or a warehouse or a refrigeration/freezer unit(s), can be divided into multiple internal zones 161-1, 161-2, 161-N. Each zone 161-1, 161-2, 161-N can be an internal space within the confined area 160-1. Further, each zone 161-1, 161-2, 161-N is associated with a temperature modification unit(s) 162-1, 162-2, 162-N that can control the rate of the temperature change with a respective zone 161-1, 161-2, 161-N. It is understood that the confined area 160-1 can be divided into any number of zones across any number of buildings, warehouses or refrigeration/freezer units, and each zone 161-1, 161-2, 161-N can be associated with any number of temperature modification units.

The demand limiting controller 150 stores, manages and continually updates zone information 151, 152, 15N for each zone 161-1, 161-2, 161-N. Zone information 151, 152, 15N includes zone settings 151-1, 152-1, 15N-1 (such as desired zone temperature ranges), and a data repository 151-2, 152-2, 15N-2 that corresponds with each zone 161-1, 161-2, 161-N, and within each zone 161-1, 161-2, 161-N.

The demand limiting controller 150 obtains the current outdoor temperature 155 outside of the confined area 160. The demand limiting controller 150 obtains the current temperature within each zone 151-3, 152-3, 15N-3 via a corresponding temperature sensor 170-1, 170-2, 170-N. For a respective zone(s) 161-1, the demand limiting controller 150 obtains the zone's 161-1 current temperature 151-3 from a temperature sensor 170-1 associated with the zone 161-1.

The demand limiting controller 150 also obtains (i.e. calculates, derives, infers) a temperature modification rate (such as a cooling rate or a heating rate) associated with the respective zone 161-1. The temperature modification rate is the length of time a temperature modification unit 162-1 in the respective zone 161-1 needs to realize (i.e. create) a temperature change within the respective zone 161-1 during presence of previously recorded outdoor temperatures and time of day.

Upon validating that a current total use of electricity 157 is below a desired maximum amount of electricity 159, the demand limiting controller 150 processes the outdoor temperature 155 and the respective zone's current temperature 15N-3 according to the temperature modification rate calculated from the respective zones data repository associated with the respective zone 161-N.

Based on the temperature modification rate associated with the respective zone 161-N, the demand limiting controller 150 determines a moment in time at which to begin changing the respective zone's current temperature readings. For example, demand limiting controller 150 determines a period of the day in which the respective zone 161-1 is often occupied (i.e. an occupied time range) with people is going to start in 60 minutes. If the demand limiting controller 150 calculates the temperature modification unit 162-1 needs a time span of fifteen minutes to realize a target temperature within the respective zone 161-1 under current outdoor temperature conditions and time of day, the demand limiting controller 150 activates the temperature modification unit 162-1 fifteen minutes before the occupied time range begins.

It is noted that an upcoming event can be, for example: a beginning of a peak billing rate time, a beginning of the respective zone's occupied time range, a beginning of the respective zone's unoccupied time range, and/or a moment in time the demand limiting controller 150 has predicted that the respective zone's current temperature will move outside a desired temperature range.

Further, it is understood that the demand limiting controller 150 continually stores the time and outdoor/indoor temperature information in the data repositories 151-2, 152-2, 15N-2 at regular intervals. With this data, the demand limiting controller 150 calculates the actual amount of time a particular temperature modification unit 162-1, 162-2, 162-N needs to effect a temperature change within a given zone 161-1, 161-2, 161-N.

The demand limiting controller 150 processes the data in the data repositories 151-2, 152-2, 15N-2 with respect to (i) the outdoor temperature (ii) time of day and (iii) a respective zone's current temperature 151-3, 152-3, 15N-3 to calculate an amount of time a particular temperature modification unit 162-1, 162-2, 162-N most likely needs to be running (at a desired level of power consumption) in order to achieve a desired temperature before an upcoming event begins.

In another embodiment, upon deriving the temperature modification rate for the respective zone 161-1 based on temperature data collected during multiple intervals of time, the demand limiting controller 150 predicts a moment in time when the respective zone's current temperature 151-3 will move outside a desired temperature range associated with the respective zone 161-1 by processing the respective zone's current temperature 151-3, time of day and the outdoor temperature 155 via the temperature modification rate. If the predicted moment in time falls within a given length of time (such as within 20 minutes), demand limiting controller 150 activates the temperature modification unit 162-1 to move the respective zone's current temperature 151-3 towards a target temperature.

Figure 2:
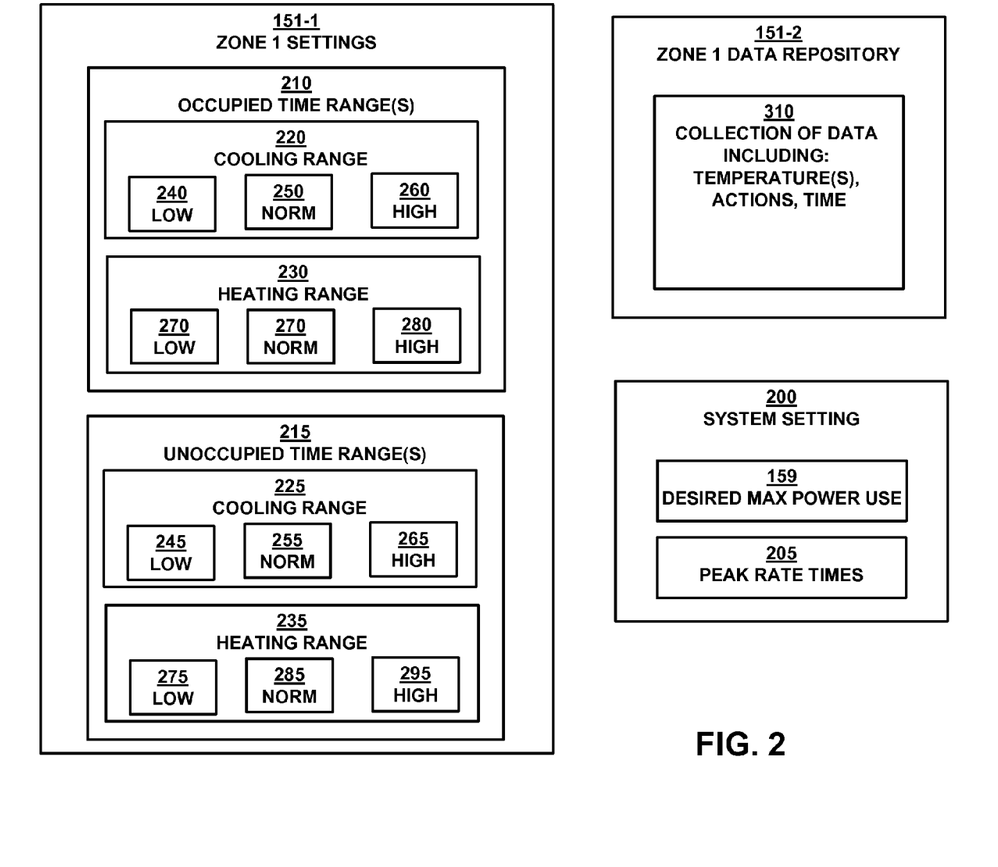
FIG. 2 is an example block diagram of settings and a data repository associated with a respective zone according to embodiments herein.

FIG. 2 is an example block diagram of settings 151-1 and a data repository 151-2 associated with a respective zone 161-1 according to embodiments herein. The zone settings 151-1 describe settings for the respective zone 161-1, such as an occupied time range 210 and an unoccupied time range 215. The occupied time range 220 includes a cooling range 220 and a heating range 230. The cooling range 220 and heating range 230 specify target temperatures to be realized by the demand limiting controller 150. For example, the cooling range 220 specifies a target low temperature 240, a target normal temperature 250 and a target high temperature 260. The heating range 230 also specifies its own target low temperature 270, target normal temperature 280 and target high temperature 290. A desired maximum power use 159 and peak rate times 205 are stored in system settings 200 as well.

For example, during the occupied time range 220, the demand limiting controller 150 is currently using no more than the desired maximum power 159 to keep the internal temperature of the respective zone 161-1 at (or near) the target normal temperature 250 of the cooling range 220. However, the demand limiting controller 150 detects that a peak rate time 205 will begin within 15 minutes. Thus, the demand limiting controller 150 begins to "pre-cool" the respective zone 161-1 so that the internal temperature in the respective zone 161-1 will be at (or near) the target low temperature 240 when the peak rate time 205 begins.

Fifteen minutes later, when the peak rate time 205 begins, the temperature in the respective zone 161-1 will have been cooled according to the target low temperature 240. However, during the peak rate time 205, the demand limiting controller 150 will utilize the target high temperature 260 of the cooling range 220—in order to use less power during the peak rate time 205—thereby reducing power consumption when the electricity rate is higher than other times during the day. When the peak rate time 205 ends, the demand limiting controller 150 will resume using power to regulate the internal temperature of the respective zone 161-1 to be at (or near) the target normal temperature 250 of the cooling range 220. It is noted that the demand limiting controller 150 utilizes the heating range 230 similarly as the cooling range 220.

In addition, the demand limiting controller 150 utilizes the unoccupied time range 215 similarly as the occupied time range 220. The unoccupied time range 215 also includes its own cooling range 225 and a heating range 235. The unoccupied time range's 215 cooling range 225 and heating range 235 specify target temperatures to be realized by the demand limiting controller 150. For example, the cooling range 225 specifies a target low temperature 245, a target normal temperature 255 and a target high temperature 265. The heating range 235 also specifies its own target low temperature 275, target normal temperature 285 and target high temperature 295.

It is understood that the demand limiting controller 150 will effect temperature changes in the respective zone 161-1 towards any of the target temperatures 240, 245, 250, 255, 260, 265, 270, 275, 280, 285, 290, 295 according to a temperature modification rate that also takes into account the influence of the current outdoor temperature's 155.

The temperature modification rate is dynamically calculated by the demand limiting controller 150 according to a collection of data 310 in the data repository 151-2 associated with the respective zone 161-1. The collection of data 310 includes a history of actions the demand limiting controller 150 performed with respect to previous temperatures (outdoor and indoor) and times. Hence, the collection of data 310 provides a model that represents how temperature changes (i.e. temperature fluctuations) have occurred in the respective zone. Based on these past data points, the demand limiting controller 150 can infer the rate at which temperature changes in the respective zone 161-1.

Figure 3:
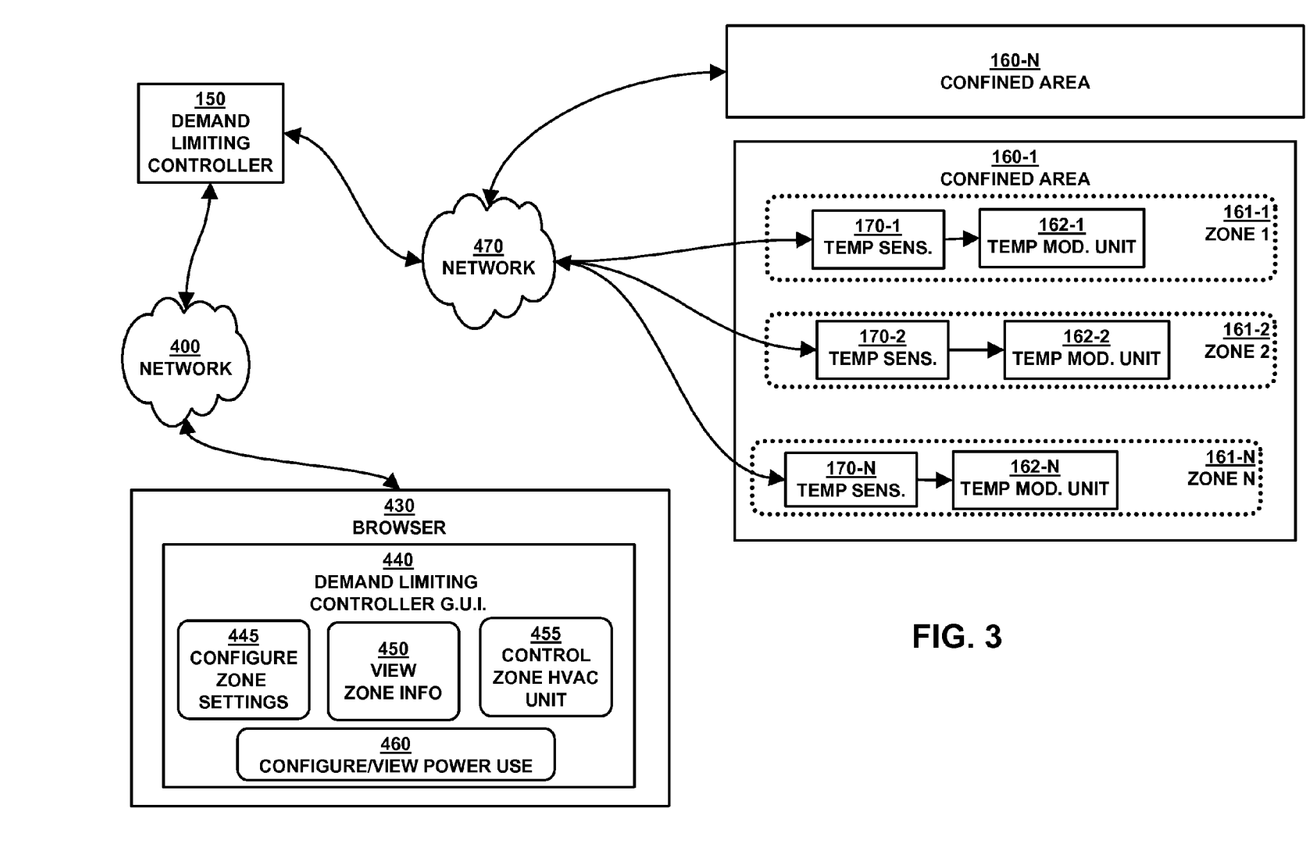
FIG. 3 is an example block diagram of a demand limiting controller monitoring and effecting temperature changes in multiple zones via a network interface according to embodiments herein.

FIG. 3 is an example block diagram of a demand limiting controller 150 monitoring and effecting temperature changes in multiple zones via a network interface according to embodiments herein. It is understood that the demand limiting controller 150 can communicate with temperature sensors and temperature modification units in multiple confined areas 160-1, 160-N.

As illustrated in FIG. 3, the demand limiting controller 150 monitors temperatures within multiple zones 161-1, 161-2, 162-N via temperature sensors 170-1, 170-2, 170-N and communicates with temperature modification units 162-1, 162-2, 162-N, via temperature sensor 170-1, 170-2 and 170-N associated with each zone's 161-1, 161-2, 161-N over a network 470. In addition, a user can input and view data via a graphical user interface 440 rendered in a web browser 430 on a client computer system that communicates with the demand limiting controller 150 via another network 400.

The graphical user interface 440 provides a settings module 445 that allows a user to input, configure and view settings for each zone 161-1, 161-2, 161-N. The graphical user interface 440 also provides a zone information module 450 which allows the user to view the data current temperature and status of each zone 161-1, 161-2, 161-N—as well as the outdoor temperature. The graphical user interface 440 further provides a control module that allows the user to directly control (i.e. modify, terminate, activate) operations of any temperature modification unit 162-1, 162-2, 162-N in real time.

In addition, the graphical user interface 440 provides a system setting module 460 that allows the user to configure a desired maximum amount of electricity to be used by each of the temperature modification units 162-1, 162-2, 162-N as a percentage of total power consumption. The power use module 460 also allows the user to view a current total amount of electricity being consumed by all temperature modification units 162-1, 162-2, 162-N—together and individual.

Figure 4:
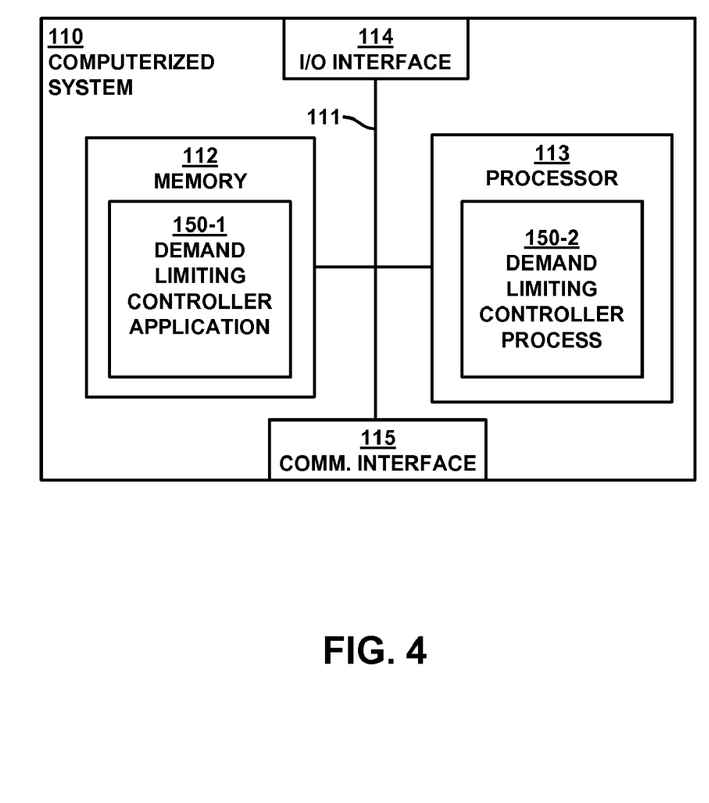
FIG. 4 is an example block diagram illustrating an architecture of a computer system that executes a demand limiting controller application and/or a demand limiting controller process according to embodiments herein.

FIG. 4 is an example block diagram illustrating an architecture of a computer system 110 that executes, runs, interprets, operates or otherwise performs a demand limiting controller application 150-1 and/or demand limiting controller process 150-2 according to embodiments herein.

Note that the computer system 110 may be any type of computerized device such as a personal computer, a client computer system, workstation, portable computing device, console, laptop, network terminal, a stand-alone computing device, or a network appliance, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, and an input/output interface 114.

In one embodiment, the computer system 110 can be a dedicated computing appliance used exclusively for the purpose of communicating with and individually controlling multiple temperature modification units. As mentioned above, depending on the embodiment, the demand limiting controller application 150-1 and/or the demand limiting controller process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the demand limiting controller application 150-1. Execution of the demand limiting controller application 150-1 in this manner produces the demand limiting controller process 150-2. In other words, the demand limiting controller process 150-2 represents one or more portions or runtime instances of the demand limiting controller application 150-1 (or the entire application 150-1) performing or executing within or upon the processor 113 in the computerized device 110 at runtime.

The demand limiting controller application 150-1 may be stored on a computer readable medium (such as a floppy disk), hard disk, electronic, magnetic, optical, flash memory, read only memory, or other computer readable medium. It is understood that embodiments and techniques discussed herein are well suited for other applications as well.

Those skilled in the art will understand that the computer system 110 may include other processes and/or software and hardware components, such as an operating system. A display (not shown) need not be coupled directly to the computer system 110. For example, the demand limiting controller application 150-1 can be executed on a remotely accessible computerized device via the communication interface 115. It is noted that in various embodiments, the demand limiting controller 150 individually communicates with multiple temperature sensors and multiple temperature modification units within zones of various confined areas.

FIG. 5 through FIG. 9 illustrate various embodiments of the demand limiting controller 150. The rectangular elements in flowcharts 500, 600, 700, 800, 900 denote "processing blocks" and represent computer software instructions or groups of instructions upon a computer readable medium (or computer readable storage medium). Additionally, the processing blocks represent steps performed by hardware such as a computer, digital signal processor circuit, application specific integrated circuit (ASIC), etc.

Flowcharts 500, 600, 700, 800, 900 do not necessarily depict the syntax of any particular programming language. Rather, flowcharts 500, 600, 700, 800, 900 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Further, it is noted that flowcharts 500, 600, 700, 800, 900 show processing steps that the demand limiting controller 150 performs with respect to each temperature modification unit 162-1, 162-2, 162-N. In other words, demand limiting controller 150 performs the processing steps of flowcharts 500, 600, 700, 800, 900 on temperature modification unit 162-1 until it arrives at step 515 (which is used in flowcharts 500, 600, 700, 800). Once the demand limiting controller 150 arrives at any instance of step 515 with respect to temperature modification unit 162-1, the demand limiting controller 150 moves on to the next temperature modification unit 162-2 to begin the processing steps of 500, 600, 700, 800, 900 with respect to temperature modification unit 162-2. Once the demand limiting controller 150 arrives at any instance of step 515 with respect to temperature modification unit 162-2, the demand limiting controller 150 moves on to the next temperature modification unit 162-N.

Thus, the demand limiting controller 150 continually and sequentially applies the processing steps of flowcharts 500, 600, 700, 800, 900 at each temperature modification unit 162-1, 162-2, 162-N. As the demand limiting controller 150 returns to re-process any of the temperature modification units 162-1, 162-2, 162-N, the demand limiting controller 150 restarts the processing steps of flowcharts 500, 600, 700, 800, 900 at each temperature modification unit 162-1, 162-2, 162-N.

Figure 5:
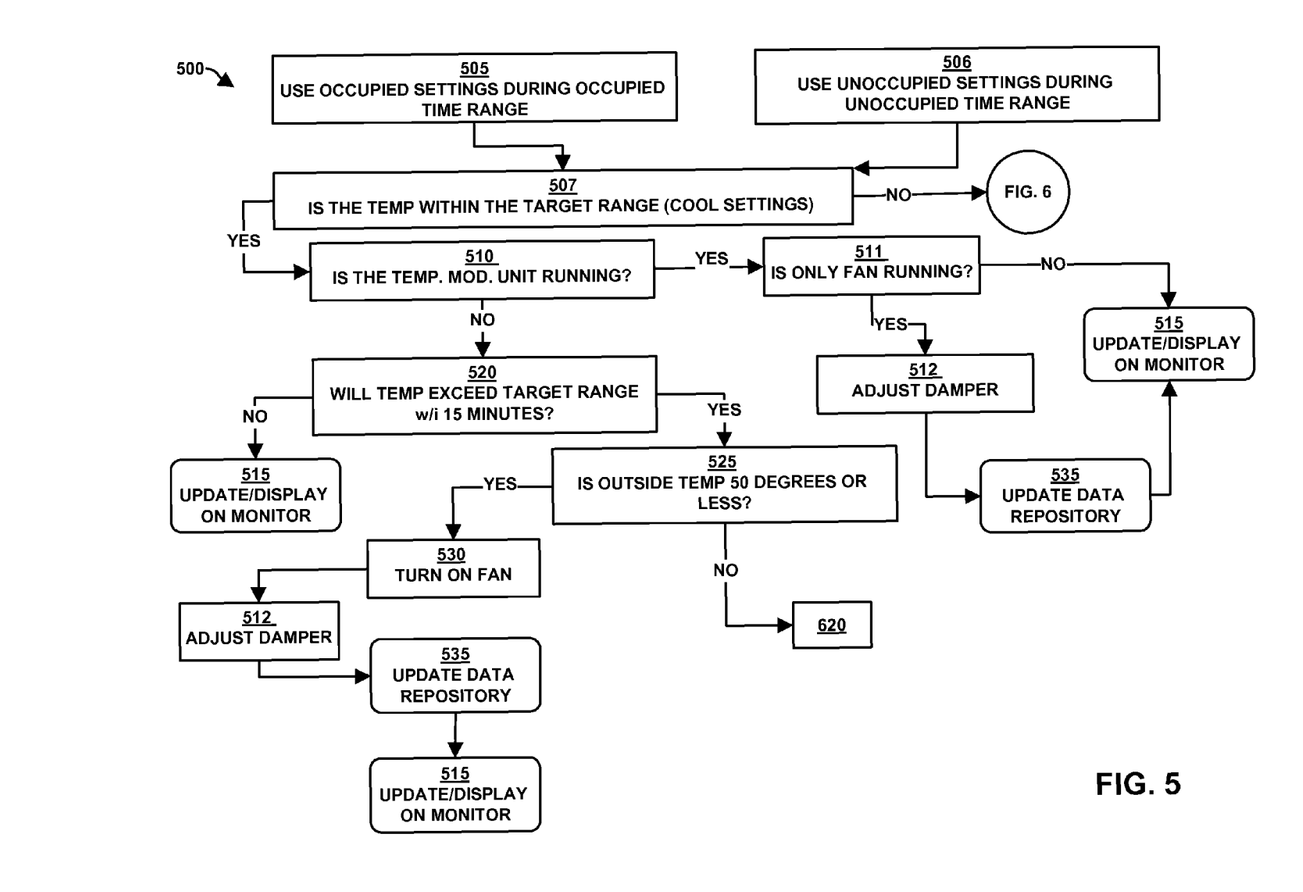
FIG. 5 is a flowchart of an example of processing steps performed by the demand limiting controller to modify temperature according to cooling settings according to embodiments herein.

FIG. 5 is a flowchart 500 of an example of processing steps performed by the demand limiting controller 150 to modify temperature according to cooling settings according to embodiments herein.

At step 505, the demand limiting controller 150 utilizes settings for an occupied time range when the occupied time range for a respective zone has begun (or is about to begin).

At step 506, if the occupied time range has not begun (or is not about to begin) then demand limiting controller 150 utilizes settings for an unoccupied time range when the unoccupied time range for a respective zone has begun (or is about to begin).

At step 507, the demand limiting controller 150 determines whether the current temperature in the respective zone falls within a target range according to cooling settings for the respective zone.

Figure 6:
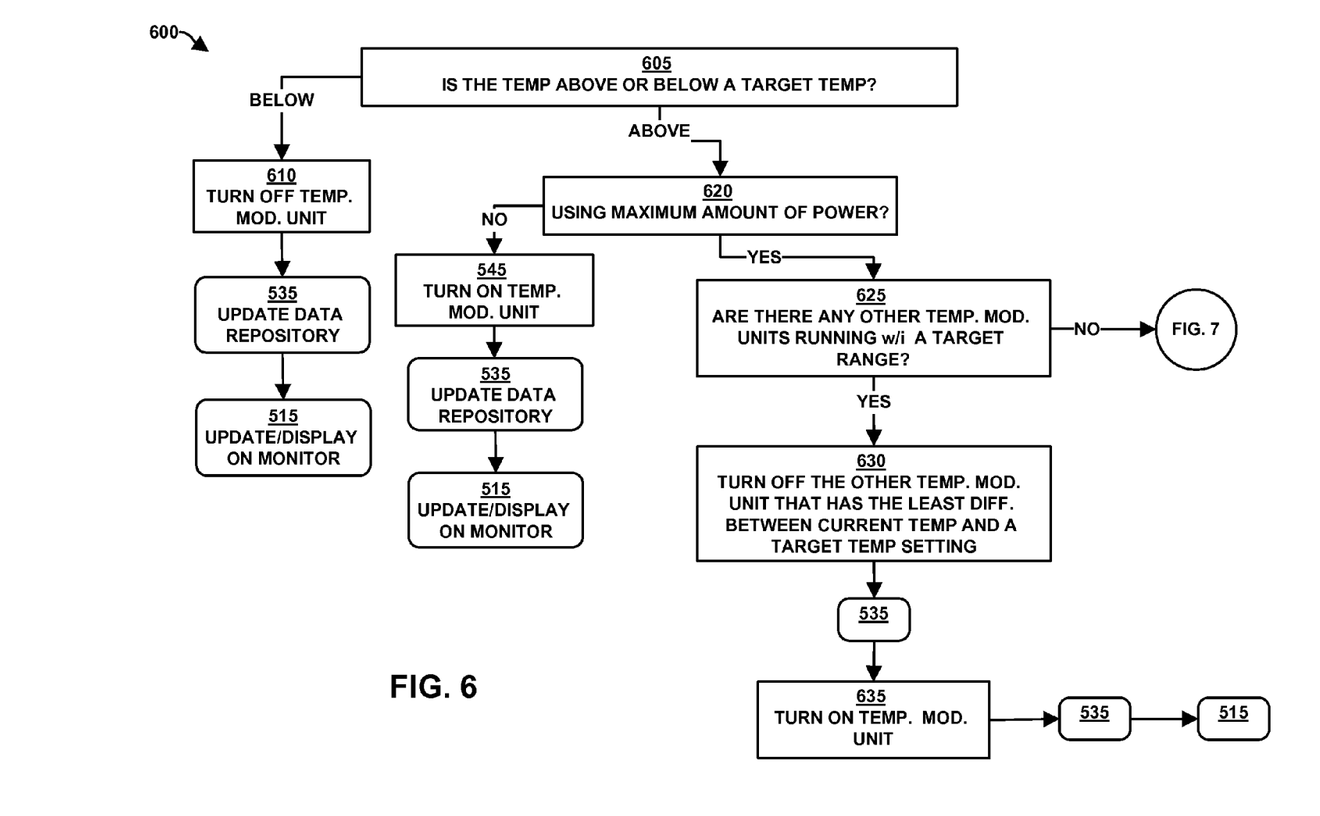
FIG. 6 is a flowchart of an example of processing steps performed by the demand limiting controller to determine cooling actions to perform when a temperature within a respective zone is either above or below a target temperature according to embodiments herein.

If the current temperature in the respective zone is not within the target range, the demand limiting controller 150 performs the actions and steps described in FIG. 6.

If the current temperature in the respective zone is within the target range, the demand limiting controller 150 performs step 510 to determine whether the temperature modification unit associated with the respective zone is running. If the temperature modification unit is running, the demand limiting controller 150 determines whether only the fan associated with the temperature modification unit is running, at step 511.

If only the fan is running, the demand limiting controller 150 adjusts the damper at step 512, and then updates the data repository (step 535), then graphical user interface of the demand limiting controller 150 displays information regarding the temperature of the respective zone and statistics regarding the temperature modification unit in the respective zone, at step 515, and then moves on to process the temperature modification unit of the next zone.

If the fan is not running, the demand limiting controller 150 performs step 515.

At step 520, the demand limiting controller 150 determines (i.e. predicts) whether the current temperature in the respective zone will exceed the target range within 15 minutes (or any other predefined span of time). If the current temperature in the respective zone will not exceed the target range within 15 minutes, the demand limiting controller 150 performs step 515.

At step 525, after the demand limiting controller 150 determines the current temperature in the respective zone will exceed the target range within 15 minutes, the demand limiting controller 150 checks to see if the outdoor temperature is 50 degrees or less (or any other user defined threshold outdoor temperature).

At step 530, if the outdoor temperature is 50 degrees or less, the demand limiting controller 150 turns on a fan associated with the respective zone in order to cool the zone with outdoor air instead of using more electricity.

At step 512, the demand limiting controller 150 controls and adjusts the fresh air damper to maximize fresh outdoor air intake.

At step 535, the demand limiting controller 150 updates the data repository with data regarding the action of turning on the fan, such as the current time, outdoor temperature and current temperature within the respective zone and then performs step 515 (i.e. update display and move on to process the temperature modification unit of the next zone).

At step 525, if the outdoor temperature is not 50 degrees or less, the demand limiting controller 150 goes to flow starting at 620, FIG. 6.

FIG. 6 is a flowchart 600 of an example of processing steps performed by the demand limiting controller 150 to determine cooling actions to perform when a temperature within a respective zone is either above or below a target temperature according to embodiments herein.

At step 605, the demand limiting controller 150 determines whether a current temperature in a respective zone is above or below a target temperature according to the respective zone's cooling settings.

At step 610, if the current temperature in the respective zone is below the target temperature, the demand limiting controller 150 turns off the temperature modification unit associated with the respective zone. The demand limiting controller 150 updates the data repository with data regarding deactivation of the temperature modification unit, such as the current time, outdoor temperature and current temperature within the respective zone (see step 535). In addition, the demand limiting controller 150 updates the graphical user interface of the demand limiting controller 150 to indicate the temperature modification unit associated with the respective zone has been turned off (see step 515).

At step 620, if the current temperature in the respective zone is above the target temperature, the demand limiting controller 150 determines whether the desired maximum amount of power (i.e. electricity) is being used.

At step 625, if the desired maximum amount of power is being used, the demand limiting controller 150 determines whether the current temperatures within any of the other zones in the confined area are within their own respective target ranges. If none of the other zones in the confined area are within their own respective target ranges, the demand limiting controller 150 performs the actions and steps described in FIG. 7.

At step 630, the demand limiting controller 150 determines that at least one other zone in the confined area is within its own respective target range. If there are multiple zones within their own respective target range, the demand limiting controller 150 turns off the temperature modification unit associated with the zone that has a least difference between its current temperature and its target temperature setting. The demand limiting controller 150 updates the data repository with data describing deactivation of the temperature modification unit for the zone that has a least difference between its current temperature and its target temperature setting (see step 535).

At step 635, the demand limiting controller 150 turns on the temperature modification unit associated with the respective zone that is currently above its target temperature. The demand limiting controller 150 updates the data repository with data regarding activation of the temperature modification unit associated with the respective zone, such as the current time, outdoor temperature and current temperature within the respective zone (see step 535). In addition, the demand limiting controller 150 updates the graphical user interface of the demand limiting controller 150 to indicate the temperature modification unit associated with the respective zone has been turned on—and moves on to the temperature modification unit of the next zone (see step 515).

If the demand limiting controller 150 determines that a desired amount of maximum power is not being used, the demand limiting controller 150 performs the steps and actions described starting at step 545.

Figure 7:
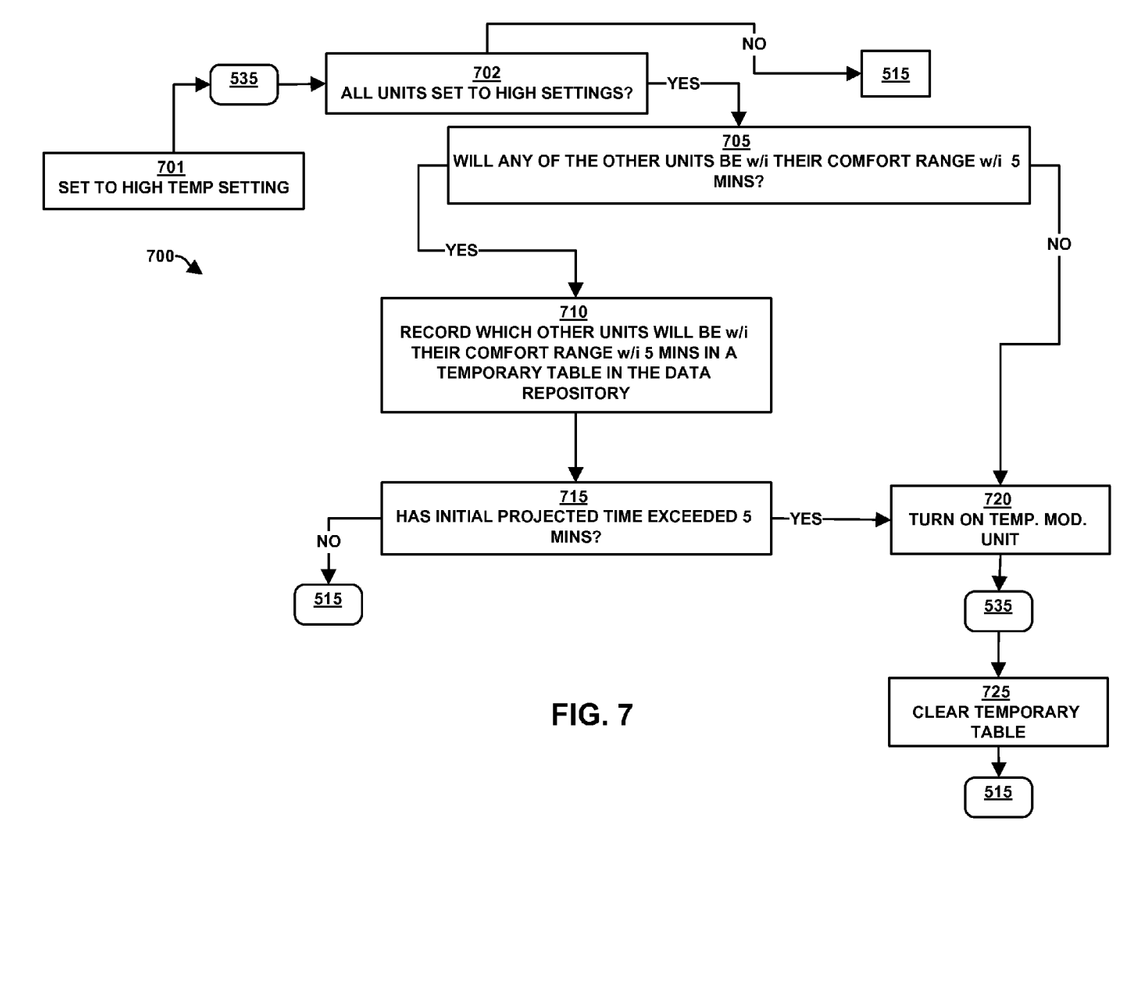
FIG. 7 is a flowchart of an example of processing steps performed by the demand limiting controller monitoring the target ranges of multiple zones according to embodiments herein.

FIG. 7 is a flowchart 700 of an example of processing steps performed by the demand limiting controller 150 monitoring the target ranges of multiple zones according to embodiments herein.

Upon performing step 625, if the demand limiting controller 150 determines that none of the other zones in the confined area are within their own respective target ranges, the demand limiting controller 150 performs step 701 to set the zone to the high temperature setting. The data is recorded as per step 535. Step 702 tests if all units are at the high temperature setting. If they are not, the graphical interface is updated as per step 515. If all units are at the high temperature setting, step 705 is executed by the demand limiting controller 150 to determine (i.e. predict) whether any of the other zones will have a current temperature that is within their own target range in the next 5 minutes (or any other user defined amount of time).

At step 710, if any of the other zones will have a current temperature that is within their own target range in the next 5 minutes, the demand limiting controller 150 creates a temporary table in the data repository and records which zones will have a current temperature that is within their own target range in the next 5 minutes (or any other user defined amount of time).

At step 715, the demand limiting controller 150 determines whether a projected amount of time has been exceeded. If the projected amount of time has not been exceeded, the demand limiting controller 150 updates the graphical user interface of the demand limiting controller 150 on the display 130 to display temporary table—and moves on to the temperature modification unit of the next zone ((see step 515).

At step 720, if (i) none of the other units will be within their target ranges within 5 minutes or (ii) the projected amount of time has been exceeded, then the demand limiting controller 150 activates the temperature modification unit associated with the respective zone. The demand limiting controller 150 updates the data repository with data regarding activation of the temperature modification unit associated with the respective zone, such as the current time, outdoor temperature and current temperature within the respective zone (see step 535).

At step 725, the demand limiting controller 150 clears the temporary table from the data repository and removes the temporary table from display via the graphical user interface of the demand limiting controller 150—and moves on to the temperature modification unit of the next zone (see step 515).

The demand limiting controller 150 updates the data repository with data regarding activation of the temperature modification unit associated with the respective zone, such as the current time, outdoor temperature and current temperature within the respective zone (see step 535). In addition, the demand limiting controller 150 updates the graphical user interface of the demand limiting controller 150 to indicate the temperature modification unit associated with the respective zone has been turned on—and moves on to the temperature modification unit of the next zone (see step 515).

Figure 8:
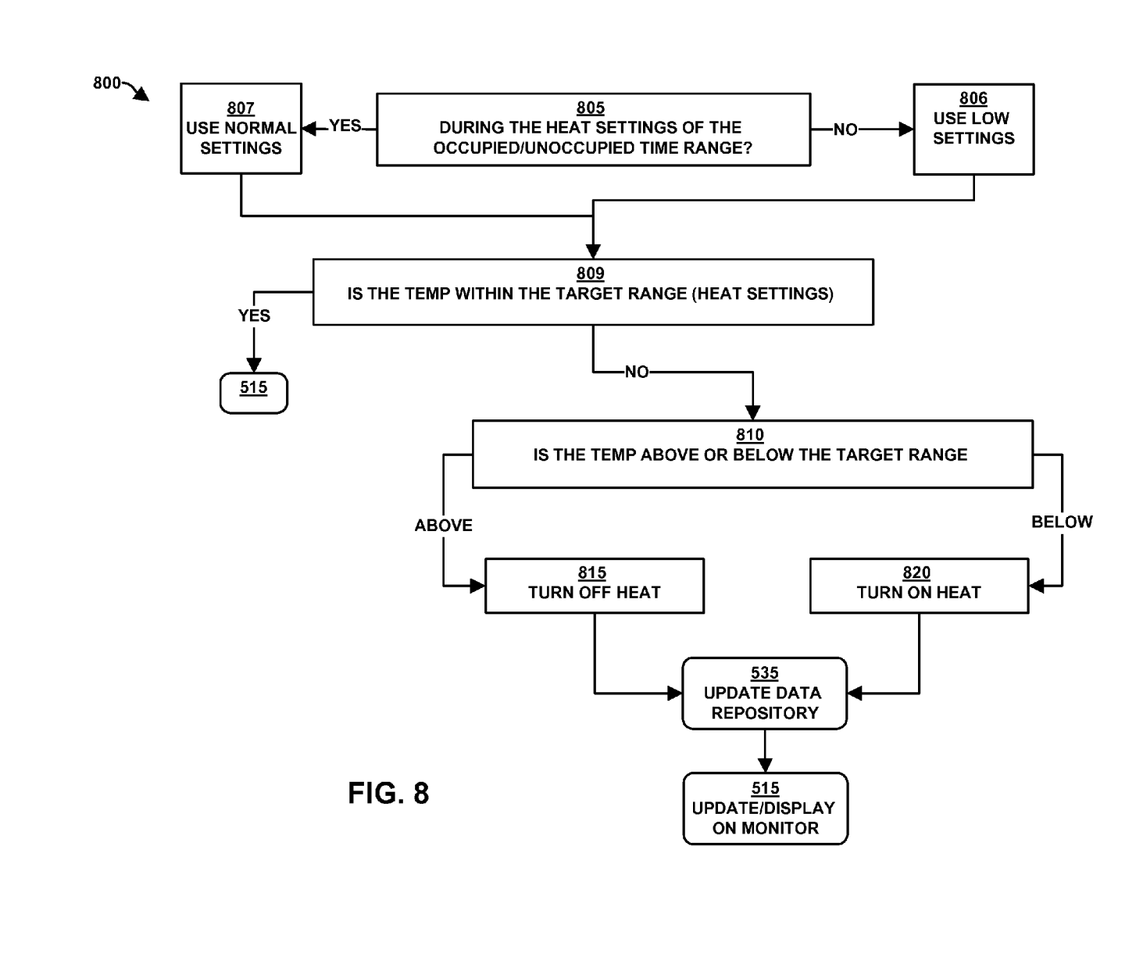
FIG. 8 is a flowchart of an example of processing steps performed by the demand limiting controller to modify temperature according to heating settings according to embodiments herein.

FIG. 8 is a flowchart 800 of an example of processing steps performed by the demand limiting controller 150 to modify temperature according to heating settings according to embodiments herein.

At step 805, the demand limiting controller 150 determines whether an occupied or unoccupied time range for a respective zone has begun (or is about to begin) and uses the respective target temperatures at steps 806, 807.

At step 809, the demand limiting controller 150 determines whether a current temperature within the respective zone is within a target range according to heating settings for the respective zone. If the current temperature within the respective zone is within the target range, the demand limiting controller 150 updates the graphical user interface of the demand limiting controller 150 to indicate the current temperature within the respective zone is within the target range (see step 515).

At step 810, upon determining the current temperature within the respective zone is not within the target range, the demand limiting controller 150 determines the current temperature within the respective zone is above or below the target range.

At step 815, if the current temperature within the respective zone is above the target range, the demand limiting controller 150 turns off the temperature modification unit associated with the respective zone.

At step 820, if the current temperature within the respective zone is below the target range, the demand limiting controller 150 turns on the temperature modification unit associated with the respective zone to increase the current temperature of the respective zone.

The demand limiting controller 150 updates the data repository with data regarding activation (or deactivation) of the temperature modification unit associated with the respective zone, such as the current time, outdoor temperature and current temperature within the respective zone (see step 535). In addition, the demand limiting controller 150 updates the graphical user interface of the demand limiting controller 150 to indicate the temperature modification unit associated with the respective zone has been turned on or turned off (see step 515).

Figure 9:
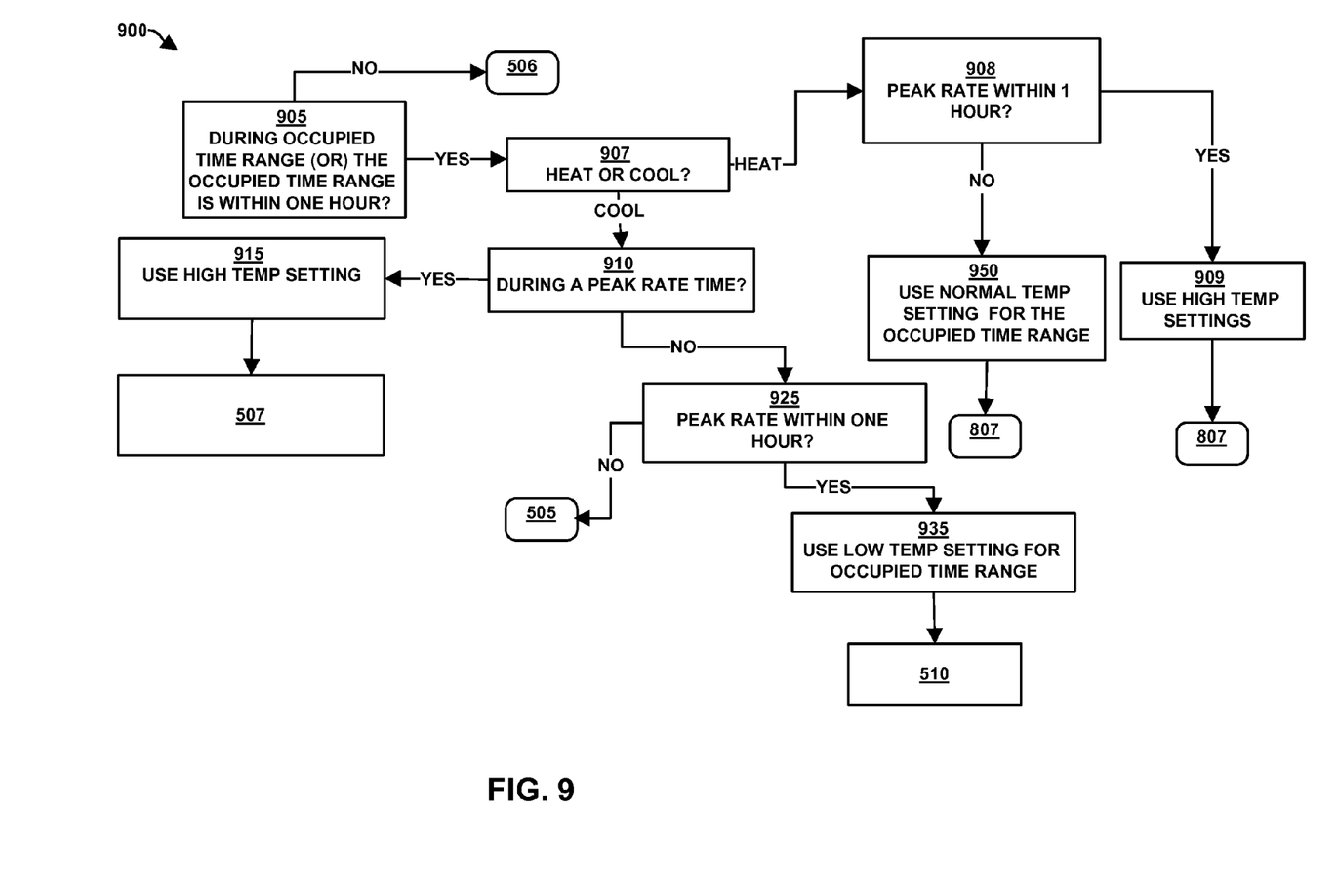
FIG. 9 is a flowchart of an example of processing steps performed by the demand limiting controller to modify temperature with respect to an occupied time range or an anticipated change occurring according to embodiments herein.

FIG. 9 is a flowchart 900 of an example of processing steps performed by the demand limiting controller 150 to modify temperature with respect to pre-cool or peak rate time range according to embodiments herein.

At step 905, the demand limiting controller 150 determines whether (i) an occupied time range for a respective zone has begun or (ii) the occupied time range for the respective zone will begin within 1 hour (or any other span of time). If the demand limiting controller 150 determines that (i) the occupied time range for the respective zone has not begun and (ii) the occupied time range for the respective zone will not begin within 1 hour (or any other span of time), then the demand limiting controller 150 performs the steps and actions described starting from step 506 in FIG. 5.

At step 907, upon determining that (i) the occupied time range for the respective zone has begun or (ii) the occupied time range for the respective zone will begin within 1 hour (or any given period of time after data has been collected), the demand limiting controller 150 will determine whether to heat or cool the respective zone.

At step 910, in order to cool the respective zone, the demand limiting controller 150 determines whether a peak rate time associated with a certain cost of electricity has begun.

At step 915, upon determining the peak rate time has begun, the demand limiting controller 150 utilizes the high target temperature of the cooling range indicated for the respective zone's occupied time range defined for use during the peak rate time and then the demand limiting controller 150 performs the steps and actions described starting from step 507 in FIG. 5.

At step 925, upon determining the peak rate time has not begun, the demand limiting controller 150 determines whether the peak rate time will begin within 1 hour (or any other user defined span of time). If not, the demand limiting controller returns to step 505 in FIG. 5.

At step 935, if the peak rate time will begin within 1 hour, the demand limiting controller 150 utilizes the low target temperature of the cooling range indicated for the respective zone's occupied time range to pre-cool the respective zone and then the demand limiting controller 150 performs the steps and actions described starting from step 510 in FIG. 5.

At step 908, upon determining to heat the respective zone (after executing step 907), the demand limiting controller 150 determines whether the peak rate time begins within an hour (or any given time range).

At step 909, if the peak rate time begins within the hour, the demand limiting controller 150 uses the high target temperature of the heating range indicated for the respective zone's occupied time range—and then the demand limiting controller 150 executes step 807 (see FIG. 8).

At step 950, if the peak rate time does not begin within the hour, the demand limiting controller 150 uses the normal target temperature of the heating range indicated for the respective zone's occupied time range—and then the demand limiting controller 150 executes step 807 (see FIG. 8).

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, flash memory, read only memory, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method in which at least one computer system accesses instructions from computer storage and executes the instructions to perform steps comprising:
    obtaining at least one temperature condition;
    obtaining at least one temperature modification rate associated with at least one respective zone from multiple zones of a confined area; and
    determining when to modify a current temperature of the respective zone with respect to an upcoming event by processing the at least one temperature condition according to the temperature modification rate, wherein obtaining the at least one temperature condition includes measuring the respective zone's current temperature and obtaining an outdoor temperature.

2. The method as in claim 1, wherein determining when to modify the current temperature of the respective zone with respect to the upcoming event by processing the temperature condition according to the temperature modification rate includes:
    while a current total use of electricity is below a desired maximum amount of electricity:
        processing the temperature condition according to a cooling rate associated with the respective zone; and
        based on the cooling rate, determining a moment in time at which to begin cooling the respective zone's current temperature towards a target low temperature before the upcoming event occurs, the target low temperature previously assigned to the respective zone.

3. The method as in claim 1, wherein determining when to modify the current temperature of the respective zone with respect to the upcoming event by processing the temperature condition according to the temperature modification rate includes:
    while a current total use of electricity is below a desired maximum amount of electricity:
        processing the temperature condition according to a heating rate associated with the respective zone; and
        based on the heating rate, determining a moment in time at which to begin heating the respective zone's current temperature towards a target high temperature before the upcoming event occurs, the target high temperature previously assigned to the respective zone.

4. The method as in claim 1, wherein the confined area is divided into at least two respective zones, each zone comprising an internal space within the at least one building, each zone associated with at least one temperature sensor and at least one temperature modification unit.

5. The method as in claim 1, wherein obtaining the temperature modification rate associated with the respective zone includes:
    calculating the temperature modification rate from a data repository, the temperature modification rate based on at least one length of time required by a temperature modification unit associated with the respective zone to change a previously measured temperature within the respective zone during presence of a previously recorded outdoor temperature and time of day.

6. The method as in claim 5, wherein determining when to modify the current temperature of the respective zone with respect to the upcoming event by processing the temperature condition according to the temperature modification rate includes:
    calculating a time span required by the temperature modification unit to realize a target temperature within the respective zone by processing the temperature condition according to the temperature modification rate; and
    when an end of the calculated time span coincides with the upcoming event, activating the temperature modification unit to move the respective zone's current temperature towards the target temperature.

7. The method as in claim 6, comprising:
    upon detecting the target temperature has been realized in the respective zone, updating the temperature modification rate in the data repository, wherein updating the temperature modification rate includes:
    representing an actual time it took to realize the target temperature in association with (i) the outdoor temperature used to calculate the time span and (ii) the respective zone's current temperature used to calculate the time span.

8. The method as in claim 5, wherein determining when to modify the current temperature of the respective zone with respect to the upcoming event by processing the temperature condition according to the temperature modification rate includes:
    predicting a moment in time when the respective zone's current temperature will move outside a desired temperature range associated with the respective zone by processing the temperature condition according to the temperature modification rate; and
    activating the temperature modification unit to move the respective zone's current temperature towards a target temperature if the predicted moment in time falls within a given length of time.

9. The method as in claim 8, comprising
    upon detecting the target temperature has been realized in the respective zone, updating the temperature modification rate in the data repository, wherein updating the temperature modification rate includes:
    representing an actual time it took to realize the target temperature in the data repository in association with (i) the outdoor temperature used to predict the moment in time and (ii) the respective zone's current temperature used to predict the moment in time.

10. The method as in claim 1, comprising:
    upon detecting (i) temperature modification unit associated with the respective zone is currently not running and (ii) the respective zone's current temperature will move outside a desired temperature range within a certain amount of time, checking whether an outside temperature is less than or equal to a threshold outdoor temperature;

if the outside temperature is less than or equal to a threshold outdoor temperature, activating a fan associated with the respective zone to cool the respective zone's current temperature; and if the outside temperature is not less than or equal to a threshold outdoor temperature, concurrently activating a fan associated with the respective zone and the temperature modification unit to cool the respective zone's current temperature.

11. A non-transitory computer readable storage medium comprising executable instructions encoded thereon operable on a computerized device to perform processing comprising:

instructions for obtaining at least one temperature condition;

instructions for obtaining at least one temperature modification rate associated with at least one respective zone from multiple zones of a confined area; and instructions for determining when to modify a current temperature of the respective zone with respect to an upcoming event by processing the at least one temperature condition according to the temperature modification rate, wherein obtaining the at least one temperature condition includes measuring the respective zone's current temperature and obtaining an outdoor temperature.

12. The computer readable storage medium as in claim 11, wherein the instructions for determining when to modify the current temperature of the respective zone with respect to the upcoming event by processing the temperature condition according to the temperature modification rate include:

instructions for processing the temperature condition according to a cooling rate associated with the respective zone while a current total use of electricity is below a desired maximum amount of electricity; and instructions for determining a moment in time, based on the cooling rate, at which to begin cooling the respective zone's current temperature towards a target low temperature before the upcoming event occurs, the target low temperature previously assigned to the respective zone.

13. The computer readable storage medium as in claim 11, wherein the instructions for determining when to modify the current temperature of the respective zone with respect to the upcoming event by processing the temperature condition according to the temperature modification rate include:

instructions for processing the temperature condition according to a heating rate associated with the respective zone while a current total use of electricity is below a desired maximum amount of electricity; and instructions for determining a moment in time, based on the cooling rate, at which to begin heating the respective zone's current temperature towards a target high temperature before the upcoming event occurs, the target low temperature previously assigned to the respective zone.

14. The computer readable storage medium as in claim 11, wherein the confined area is divided into at least two respective zones, each zone comprising an internal space within the at least one building, each zone associated with at least one temperature sensor and at least one temperature modification unit.

15. The computer readable storage medium as in claim 11, wherein the instructions for obtaining the temperature modification rate associated with the respective zone include:

instructions for retrieving the temperature modification rate from a data repository, the temperature modification rate based on at least one length of time required by a temperature modification unit associated with the respective zone to change a previously measured temperature within the respective zone during presence of a previously recorded outdoor temperature.

16. The computer readable storage medium as in claim 15, wherein the instructions for determining when to modify the current temperature of the respective zone with respect to the upcoming event by processing the temperature condition according to the temperature modification rate include:

instructions for calculating a time span required by the temperature modification unit to realize a target temperature within the respective zone by processing the temperature condition according to the temperature modification rate; and instructions for activating the temperature modification unit to move the respective zone's current temperature towards the target temperature when an end of the calculated time span coincides with the upcoming event.

17. The computer readable storage medium as in claim 16, comprising:

instructions for updating the temperature modification rate in the data repository upon detecting the target temperature has been realized in the respective zone, wherein the instructions for updating the temperature modification rate include:

instructions for storing clock time in association with (i) the outdoor temperature used to calculate the time span and (ii) the respective zone's current temperature used to calculate the time span.

18. The computer readable storage medium as in claim 15, wherein the instructions for determining when to modify the current temperature of the respective zone with respect to the upcoming event by processing the temperature condition according to the temperature modification rate include:

instructions for predicting a moment in time when the respective zone's current temperature will move outside a desired temperature range associated with the respective zone by processing the temperature condition according to the temperature modification rate; and instructions for activating the temperature modification unit to move the respective zone's current temperature towards a target temperature if the predicted moment in time falls within a given length of time.

19. The computer readable storage medium as in claim 18, comprising instructions for updating the temperature modification rate in the data repository upon detecting the target temperature has been realized in the respective zone, wherein the instructions for updating the temperature modification rate includes:

instructions for storing an actual time it took to realize the target temperature in the data repository in association with (i) the outdoor temperature used to predict the moment in time and (ii) the respective zone's current temperature used to predict the moment in time.

20. The computer readable storage medium as in claim 11, comprising:

instructions for checking whether an outside temperature is less than or equal to a threshold outdoor temperature upon detecting (i) a temperature modification unit associated with the respective zone is currently not running and (ii) the respective zone's current temperature will move outside a desired temperature range within a certain amount of time;

instructions for activating a fan associated with the respective zone to cool the respective zone's current temperature if the outside temperature is less than or equal to a threshold outdoor temperature; and instructions for concurrently activating a fan associated with the respective zone and the temperature modification unit to cool the respective zone's current temperature if the outside temperature is not less than or equal to a threshold outdoor temperature.

21. A computer system comprising:

a processor;

a memory unit that stores instructions associated with an application executed by the processor; and an interconnect coupling the processor and the memory unit, enabling the computer system to execute the application and perform operations of:

obtaining at least one temperature condition;

obtaining at least one temperature modification rate associated with at least one respective zone from multiple zones of a confined area; and determining when to modify a current temperature of the respective zone with respect to an upcoming event by processing the at least one temperature condition according to the temperature modification rate, wherein obtaining the at least one temperature condition includes measuring the respective zone's current temperature and obtaining an outdoor temperature; and determining a current electrical use associated with any zone with respect to a target electricity usage based on a percentage of a desired maximum use of electricity.

22. A method in which at least one computer system accesses instructions from computer storage and executes the instructions to perform steps comprising:

during a first time range, confirming a current use of electrical power is less than a desired maximum use of electrical power;

based on the current use of electrical power being less than the desired maximum use of electrical power, detecting a current temperature within a portion of a confined area is substantially near a first target temperature of a given temperature range;

detecting a second time range will begin within an amount of time;

modifying the current temperature within the portion of a confined area to be substantially near a second target temperature of the given temperature range before the second time range begins;

during the second time range, regulating the current temperature within the portion of a confined area with respect to a third target temperature of the given temperature range; and upon termination of the second time range, regulating the current temperature within the portion of a confined area with respect to the first target temperature of the given temperature range.

23. A method in which at least one computer system accesses instructions from computer storage and executes the instructions to perform steps comprising:

during a first time range, confirming a current use of electrical power is less than a desired maximum use of electrical power;

while the current use of electrical power being less than the desired maximum use of electrical power, detecting a current temperature within a portion of a confined area is substantially near a preferred normal target temperature of a given temperature range;

detecting a peak rate time range will begin within an amount of time, the peak rate time range associated with a higher cost of electricity than a cost of electricity during the first time range;

pre-cooling the portion of the confined area before the peak rate time range begins, wherein pre-cooling comprises: modifying the current temperature within the portion of the confined area, in accordance with a temperature modification rate, to be substantially near a low target temperature of the given temperature range, the temperature modification rate based on a modeling of past temperature fluctuations in the portion of the confined area;

during the peak rate time range, regulating the current temperature within the portion of the confined area with respect to a high target temperature of the given temperature range; and upon termination of the peak rate time range, regulating the current temperature within the portion of a confined area with respect to the preferred normal target temperature of the given temperature range.

* * * * *